US009950755B2

(12) United States Patent
Tesch et al.

(10) Patent No.: US 9,950,755 B2
(45) Date of Patent: Apr. 24, 2018

(54) VEHICLE HAVING AN AIR-GUIDING ARRANGEMENT

(71) Applicant: Bayerische Motoren Werke Aktiengesellschaft, Munich (DE)

(72) Inventors: Gregor Tesch, Garching (DE); Markus Fauser, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/384,677

(22) Filed: Dec. 20, 2016

(65) Prior Publication Data

US 2017/0101137 A1    Apr. 13, 2017

Related U.S. Application Data

(63) Continuation of application No. PCT/EP2015/066188, filed on Jul. 15, 2015.

(30) Foreign Application Priority Data

Jul. 15, 2014    (DE) .................. 10 2014 213 678

(51) Int. Cl.
*B62D 35/02*    (2006.01)
*B62D 37/02*    (2006.01)
*B62D 35/00*    (2006.01)

(52) U.S. Cl.
CPC ......... *B62D 35/005* (2013.01); *B62D 35/008* (2013.01); *B62D 35/02* (2013.01); *B62D 37/02* (2013.01)

(58) Field of Classification Search
CPC .... B62D 35/00; B62D 35/005; B62D 35/008; B62D 35/02; B62D 37/02
See application file for complete search history.

(56) References Cited

U.S. PATENT DOCUMENTS 4,951,994 A    8/1990    Miwa
2003/0173798 A1    9/2003    Steinicke et al.
(Continued)

FOREIGN PATENT DOCUMENTS

DE    35 25 627 A1    3/1986
DE    42 29 945 A1    3/1994
(Continued)

OTHER PUBLICATIONS

International Search Report (PCT/ISA/210) issued in PCT Application No. PCT/EP2015/066188 dated Oct. 12, 2015 with English translation (Six (6) pages).
(Continued)

*Primary Examiner* — Gregory Blankenship
(74) *Attorney, Agent, or Firm* — Crowell & Moring LLP

(57) ABSTRACT

A vehicle has an air-guiding device arranged on a lower side of the vehicle in front of a vehicle wheel. The air-guiding device includes an air-guiding body which has a side region running substantially in the vertical direction of the vehicle and facing a vehicle center, and a bottom region which faces an underlying surface and is connected to the side region and is spaced apart from the lower side. In an outer region of the air-guiding body, which faces away from the vehicle center and is connected to the bottom region and is formed with a convex curvature with respect to the outer side of the vehicle, an air flow can be directed in the direction of an outer flank of the vehicle wheel, while an air flow can be oriented in the longitudinal direction of the vehicle via the side region guiding surface.

20 Claims, 1 Drawing Sheet

(56) References Cited

U.S. PATENT DOCUMENTS

| | | | |
|---|---|---|---|
| 2004/0155485 A1* | 8/2004 | Hamnett | B62D 35/008 296/180.1 |
| 2007/0182207 A1 | 8/2007 | Nakaya | |
| 2012/0013146 A1 | 1/2012 | Wolf et al. | |
| 2013/0026783 A1* | 1/2013 | Kakiuchi | B62D 35/02 296/180.1 |
| 2013/0026790 A1* | 1/2013 | Kakiuchi | B62D 35/02 296/193.07 |
| 2013/0026797 A1* | 1/2013 | Onodera | B62D 35/02 296/204 |
| 2013/0059519 A1* | 3/2013 | Tajima | B60K 11/04 454/152 |
| 2014/0097638 A1* | 4/2014 | Froling | B62D 35/02 296/180.1 |
| 2015/0210324 A1* | 7/2015 | Kojima | B62D 35/005 296/180.1 |
| 2017/0057565 A1* | 3/2017 | Sarhadiangardabad | B62D 35/02 |
| 2017/0101137 A1* | 4/2017 | Tesch | B62D 35/02 |
| 2017/0129552 A1* | 5/2017 | Han | B62D 35/02 |
| 2017/0144636 A1* | 5/2017 | Schmidt | F16D 65/847 |

FOREIGN PATENT DOCUMENTS

| | | |
|---|---|---|
| DE | 100 45 640 A1 | 3/2002 |
| DE | 10 2006 014 443 A1 | 10/2007 |
| DE | 10 2007 002 331 A1 | 10/2007 |
| DE | 10 2007 045 004 A1 | 4/2009 |
| DE | 10 2010 036 442 A1 | 1/2012 |
| DE | 10 2010 037 616 A1 | 3/2012 |
| EP | 1 674 381 A1 | 6/2006 |
| EP | 2 557 024 A1 | 2/2013 |
| FR | 2 858 793 A1 | 2/2005 |
| WO | WO 02/49906 A1 | 6/2002 |

OTHER PUBLICATIONS

German-language Written Opinion (PCT/ISA/237) issued in PCT Application No. PCT/EP2015/066188 dated Oct. 12, 2015 (Seven (7) pages).

German-language Search Report issued in counterpart German Application No. 10 2014 213 678.4 dated Jun. 9, 2015 with partial English translation (Thirteen (13) pages).

* cited by examiner

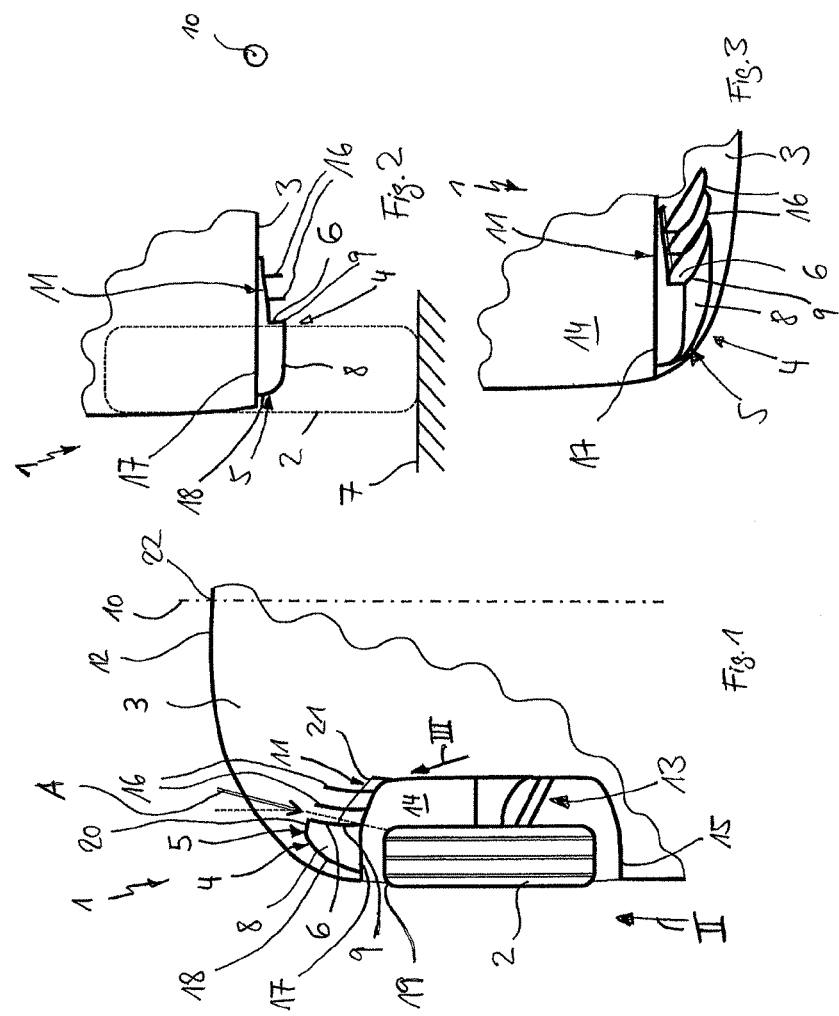

VEHICLE HAVING AN AIR-GUIDING ARRANGEMENT

CROSS REFERENCE TO RELATED APPLICATIONS

This application is a continuation of PCT International Application No. PCT/EP2015/066188, filed Jul. 15, 2015, which claims priority under 35 U.S.C. § 119 from German Patent Application No. 10 2014 213 678.4, filed Jul. 15, 2014, the entire disclosures of which are herein expressly incorporated by reference.

BACKGROUND AND SUMMARY OF THE INVENTION

The invention relates to a vehicle having an air-guiding device arranged in front of a vehicle wheel on a lower side of the vehicle.

From European Patent document EP 1 674 381 B1, an air-guiding device for a vehicle is known, which is arranged in the region in front of a vehicle wheel and projects downward in the direction of the road. The air-guiding device has an air-guiding body, which is convexly curved on its front side facing away from the wheel, and which, on at least one segment of its free end section, has a separation edge in order to reduce a flow pressure acting upon the wheel and reduce a total air drag of the vehicle. The method of operation on which the air-guiding device is based represents a so-called flow partition of the rotating wheel as well as of the respectively assigned axle geometry. Downstream of the air-guiding device, a wake space is generated in the flow, which partitions off components potentially exposed to the flow, such as a vehicle wheel and an axle geometry, in order to reduce the total air drag of the vehicle.

As a result of the occurring turbulent flow and the accompanying flow separation, however, another air drag is generated in the region of the vehicle which is related to the extent of the wake space. In particular, the resulting typical diagonal flow against the wheels contributes to the total air drag. Furthermore, an aerodynamically unfavorable situation is generated as a result of the turbulent flow against the vehicle underbody situated downstream of the air-guiding device.

It is an object of the invention to provide a vehicle having a low total air drag.

This and other objects are achieved by a vehicle according to the invention designed with a three-dimensionally shaped air-guiding device, which is constructed with an aerodynamically effective surface or guiding surface. The surface essentially extends in the vertical direction of the vehicle and is formed by a side region facing the vehicle center.

The air-guiding device is arranged in front of a vehicle wheel on a lower side of the vehicle and includes an air-guiding body, which has the guiding surface extending essentially in the vertical direction of the vehicle and facing a vehicle center. The body includes a bottom region which faces an underlying surface and is connected to the guiding surface and is spaced away from the lower side.

In order to be able to orient an air stream or flow on the outer side of the air-guiding body to a desired extent, an outer region of the air-guiding body, which faces away from the vehicle center and is connected with the bottom region, is constructed with a convex curvature with respect to an outer side of the vehicle. The air stream can be directed by way of the outer region of the air-guiding body in the direction of an outer flank of the vehicle wheel in order to minimize or avoid the transverse flow against the vehicle wheel.

Furthermore, an air stream can be oriented by way of the guiding surface in the longitudinal direction of the vehicle, whereby turbulences are reduced during the flow separation in the region of blunt wheel baffle bodies as well as a diagonal flow against the vehicle wheels or the front wheels of a vehicle, particularly in the region of the rim base.

By way of the invention, it is achieved that the air stream which, in the region of the vehicle wheels, particularly in the region of the front wheels, in principle, flows in with a flow direction pointing diagonally to the outer side of the vehicle, is oriented by the guiding surface in the longitudinal direction of the vehicle. This reduces the above-mentioned diagonal flow, particularly against the front wheels, in which case, because of the pressure conditions in the region of the vehicle wheel, the air stream is nevertheless deflected slightly in the direction of the wheel interior and is guided at least partially into the wheel interior, whereby the cooling of the wheel brake is promoted.

In this context, the term "wheel baffle bodies" subsumes aerodynamic components which are arranged in front of a vehicle wheel and are also provided for shielding a lower side of the wheel house and constructed within the scope according to the invention.

In a further development of the invention, the air stream can be oriented by way of the guiding surface additionally in the direction of the vehicle center. In this case, by way of a corresponding design of the guiding surface, a portion of the air stream is oriented in the direction of the vehicle center and is thereby steered away from the interior side of the wheel, so that the flowing-in of flowing air into the rim base is reduced. A lowering of the air drag coefficient is connected with the above. However, simultaneously, as a result of the reduced flowing of air stream into the rim base, the cooling of the wheel brake is reduced, so that this measure has to be adapted to the overall concept of the vehicle. This measure can, for example, be used in the case of vehicles where the focus is on the reduction of fuel consumption.

By way of the guiding surface or the side region and an edge provided in the joint or transition region between the guiding surface and the bottom region, which edge is constructed to essentially extend in the longitudinal direction of the vehicle, the flow is captured in a region of the air-guiding body facing the front side of the vehicle in the flow direction and is oriented by way of the side region or the guiding surface at the air-guiding body or along the wheel baffle body in the longitudinal direction of the vehicle and even in the direction of the vehicle center.

When the guiding surface is arranged to extend at least approximately at a right angle with respect to the lower side of the vehicle, the tendency of the flow to flow over the air guiding body, starting from the vehicle center in the direction of the outer side of the vehicle essentially in the transverse direction of the vehicle will be minimized, whereby the flow guidance can be oriented along the interior region of the air-guiding body to the desired extent in the longitudinal direction of the vehicle or also in the direction of the vehicle center.

When the air-guiding body projects beyond the vehicle underbody in the flow direction increasingly in the direction of the underlying surface of the vehicle, the flow in the region of the air-guiding body is guided with low losses away in the downward direction by the wheel house following the air-guiding body in the flow direction with respect to the vertical direction of the vehicle.

When the guiding surface of the air-guiding body and the edge of the joint region are constructed with a concave curvature with respect to the vehicle center, the flow will at first attach itself in the forward region of the air-guiding body without deflections that increase the air drag. Subsequently, the flow is guided away from the side region, corresponding to the curvature radius of the side region, from the vehicle wheel following the air-guiding body, the assigned axle geometry as well as the wheel house in the longitudinal direction of the vehicle and, in the case of a corresponding length of the air-guiding body, under certain circumstances, additionally deflected in the direction of the vehicle center.

For this purpose, it is particularly advantageous for a space between the guiding surface or side region and the vehicle center to increase starting from the forward region of the side region in the direction of the rearward region of the guiding surface and, under certain circumstances, to even decrease again in the direction of the vehicle center. This is a result of the fact that the flow takes place onto the lower side of a vehicle starting from its forward center stagnation point at a vehicle-specific flow angle with respect to a longitudinal axis of the vehicle in the direction of the exterior sides of the vehicle, and the diagonal flow in the region of the lower side of the vehicle is then guided with low losses to the desired extent away from the vehicle wheel, the respectively assigned axle geometry and the wheel house from the air guiding body or is guided past it with low losses.

In addition, the air-guiding device may be constructed with an additional air-guiding body or with a wedge or a similar geometry, which is arranged between the air-guiding body and the vehicle center. The flow is then easily and at low losses deflected at the lower side of the vehicle, and the flow is primarily guided by way of the chassis and the rear edge of the wheel house.

The additional air-guiding body projects beyond the lower body of the vehicle preferably increasingly in the flow direction, in order to be able to deflect the flow to the desired extent.

In order to reduce the diagonal flow against the vehicle wheel, at least one air-guiding web or a preferably perpendicularly standing guiding fin is provided in the region of the additional air-guiding body, by which the flow on the lower side of the vehicle can be deflected to an extent that reduces the diagonal flow against it.

When the air-guiding web has a concave curvature that at least approximately corresponds to the guiding surface, the deflection of the flow is again achieved with low losses.

When the height of the air-guiding web increases at least in sections, the effect of the air-guiding web is further increased, because an endeavor, which increases in the flow direction, of flowing over the air-guiding web in the transverse direction of the vehicle, is countered at low expenditures.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a schematic partial bottom view of a vehicle in the region of a vehicle front wheel.

FIG. 2 is a view in a direction of arrow II marked in detail in FIG. 1 of the region of the vehicle illustrated in FIG. 1.

FIG. 3 is a simplified three-dimensional partial representation of a view in the direction of arrow III illustrated in FIG. 1.

DETAILED DESCRIPTION OF THE DRAWINGS

FIG. 1 illustrates a forward region of a vehicle 1 or of a motor vehicle having a vehicle wheel 2. An air-guiding device 4 with a first air-guiding body 5 is provided on a lower side 3 of the vehicle 1. The three-dimensional and hollow-constructed air-guiding body 5 has a guiding surface 6 also illustrated in FIGS. 2 and 3 which, in the embodiment illustrated in the drawing, is arranged at least approximately at a right angle with respect to the lower side 3 of the vehicle and will be called a side region 6 in the following. The side region 6 is connected with a bottom region 8 facing an underlying surface 7, which bottom region 8 is spaced away from the lower side 3 of the vehicle. In the joint region between the side region 6 and the bottom region 8, an edge 9 is provided which extends essentially in the longitudinal direction of the vehicle and carries out a separation of a flow region formed with respect to a vehicle center 10 beside the side region 6 by the first air-guiding body and a flow region 8 bounded by the bottom region 8 and the underlying surface 7. The sharp-edged transition between the side region 6 and the bottom region 8 has the effect that the flow guided along the side region, if at all, flows only to a minor extent over the edge 9 into the flow region bounded between the underlying surface 7 and the bottom region 8, and an undesired transverse flow against the wheel 2 essentially does not take place.

In the present case, a second air-guiding body 11 is provided between the first air-guiding body 5 and the vehicle center 10 and extends from the side region 6 essentially into the transverse direction of the vehicle. The first air-guiding body 5 as well as the second air-guiding body 11 increasingly project beyond the vehicle underbody 3 in the direction of the underlying surface starting from a vehicle forward side 12 in the direction of the vehicle wheel 2, in which case, the air-guiding device 4 closes off flush with a forward edge 17 of a wheel house 14. Upstream of the air-guiding device 4, the air flowing along on the vehicle underbody 3 is guided in the region of the first air-guiding body 5 and in the region of the second air-guiding body 11 from the flow plane of the vehicle underbody 3 in the direction of the underlying surface 7, in order to be able to partition off the vehicle wheel 2, an axle geometry 13 and the wheel house 14, if possible, from the flow on the lower side 3 of the vehicle. A forward region 21 of the second air-guiding body 11 facing the forward side of the vehicle is arranged offset with respect to the forward region 20 of the first air-guiding body 5 in the flow direction, and a height of the second air-guiding body 11 is less than a height of the first air-guiding body 5, because the flow in the region of the second air-guiding body 11 is to be guided away from the lower side 3 to a lesser extent, in order to minimize the total air drag of the vehicle 1 to a desired extent.

The first air-guiding body 5 as well as the second air-guiding body 11 have an at least approximately wedge-shaped geometry in the flow direction, which geometry causes an easy and low-loss deflection of the flow primarily by way of the chassis or the axle geometry and a rear edge 15 of the wheel house 14. The concave curvature of the side region 6 and of the edge 9 as well as a convex curvature of an outer region 18 of the air-guiding body, which curvature is convex with respect to the outer side of the vehicle, ensure an easy and low-loss deflection of the flow in the longitudinal direction of the vehicle and the transverse direction of the vehicle, in order to minimize a transverse flow against the vehicle wheel 2 and a flowing into a rim of the vehicle wheel 2.

In addition, perpendicularly standing guiding webs or guiding fins 16 are provided in the region of the second air-guiding body 11, which also reduce a diagonal flow against the vehicle wheel 2. A height of the guiding fins 10 increases, as does the height of the first air-guiding body 5 and of the second air-guiding body 11 in the flow direction, i.e. starting from the vehicle forward side 12 in the direction of the vehicle wheel 2, in which case the guiding webs 16 extend in the longitudinal direction of the vehicle approximately along the same length as the air-guiding body 5 on the lower side 3 of the vehicle.

An arrow A shown in FIG. 1 illustrates the flow direction of the air in the region of the air-guiding device 4, which occurs as a function of the aerodynamic design of the vehicle body and of the lower side 3 of the vehicle 1, starting from a stagnation point 22 of the vehicle 1 arranged in the region of the vehicle center 10 and of the forward side 12 of the vehicle. In this case, the flow direction A of the flow in the region of the lower side 3 of the vehicle 1 varies as a function of the distance from the vehicle center 10 and as a function of the aerodynamic design of the vehicle 1. The concave curvature of the side region 6 and the convex curvature of the outside region 18 of the first air-guiding body 5 are also designed as a function of the flow direction A. In addition, a curvature of the guiding fins 16 is also adapted to the flow direction in order to be able to minimize the transverse flow against the vehicle wheel 2 as a function of the respectively existing aerodynamic design of the vehicle 1 while deflection losses are simultaneously low.

In principle, the air-guiding device 4 represents a wheel baffle body that is divided into two regions which are fluidically separated from one another by an aerodynamically effective surface, i.e. the guiding surface or the side region 6. The vehicle wheel 2 is partitioned off from the flow against it by the first air-guiding body 5, the flow being directed by the first air-guiding body 5 in the outer region 18 such that the latter only touches an outer wheel flank 19 in the longitudinal direction of the vehicle.

In the region of the interior side of the vehicle wheel 2, the flow is captured in a forward region 20 of the air-guiding direction 4 in the flow direction, and, in the side region 6 as well as in the region of the guiding fins 16, is oriented in the longitudinal direction of the vehicle and additionally in the direction of the vehicle center 10.

The additional orientation of the air stream in the direction of the vehicle center 10 is achieved by a corresponding design of the side region 6 in its end region. As illustrated by the bottom view of the vehicle in FIG. 1, the end region of the side regions is slightly inclined toward the interior in the direction of the vehicle center 10. In other words, a tangent placed in a horizontal plane against the end region of the side region 6 deviates from the longitudinal direction of the vehicle at a small angle.

By means of the arrangement of the air-guiding device 4, turbulences are reduced during the stall in the region of blunt wheel baffle bodies, as well a diagonal flow against the vehicle wheels 2 or front wheels of a vehicle, particularly in the region of the rim base. Furthermore, by way of the air-guiding device 4, an advantageous reattaching of the underbody flow downstream of the wheel house 14 is achieved and, on the whole, a total air drag of the vehicle 1 is reduced in comparison to the known solutions.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle, comprising:
    an air-guiding device arranged on a lower side of the vehicle in front of a vehicle wheel, which air-guiding device comprises an air-guiding body having a guiding surface essentially extending in a vertical direction of the vehicle and facing a vehicle center, and a bottom region which faces an underlying surface, is connected with the guiding surface and is spaced away from the lower side of the vehicle, wherein
    the air-guiding body has an outer region which faces away from the vehicle center, is connected with the bottom region and is constructed with a convex curvature with respect to an outer side of the vehicle such that an air stream in the outer region of the air-guiding body is guidable in the direction of an outer flank of the vehicle wheel, while another air stream is oriented by way of the guiding surface in the longitudinal direction of the vehicle, and
    the air-guiding device has an additional air-guiding body, which is arranged in the transverse direction of the vehicle between the air-guiding body and the vehicle center in the longitudinal direction of the vehicle, is constructed with a lower depth than the air-guiding body and extends directly from the guiding surface or at a distance from the guiding surface essentially in the direction of the vehicle center.

2. The vehicle according to claim 1, wherein
    the other air stream is oriented by way of the guiding surface additionally in the direction of the vehicle center.

3. The vehicle according to claim 1, wherein
    an edge extending essentially in the longitudinal direction of the vehicle is provided in a joint region between the guiding surface and the bottom region.

4. The vehicle according to claim 2, wherein
    an edge extending essentially in the longitudinal direction of the vehicle is provided in a joint region between the guiding surface and the bottom region.

5. The vehicle according to claim 1, wherein
    the guiding surface is arranged to be extending at least approximately at a right angle with respect to the lower side of the vehicle.

6. The vehicle according to claim 4, wherein
    the guiding surface is arranged to be extending at least approximately at a right angle with respect to the lower side of the vehicle.

7. The vehicle according to claim 1, wherein
    the bottom region and the guiding surface of the air-guiding body increasingly project beyond the lower side of the vehicle, starting from a region of the air-guiding body facing a forward side of the vehicle, in the direction of a region facing away from the forward side of the vehicle.

8. The vehicle according to claim 6, wherein
    the bottom region and the guiding surface of the air-guiding body increasingly project beyond the lower side of the vehicle, starting from a region of the air-guiding body facing a forward side of the vehicle, in the direction of a region facing away from the forward side of the vehicle.

9. The vehicle according to claim 3, wherein the guiding surface and the edge of the joint region are constructed with a concave curvature with respect to the vehicle center.

10. The vehicle according to claim 8, wherein the guiding surface and the edge of the joint region are constructed with a concave curvature with respect to the vehicle center.

11. The vehicle according to claim 7, wherein a distance between a region of the guiding surface facing the forward side of the vehicle and the vehicle center in the transverse direction of the vehicle is smaller than a distance between the region of the guiding surface facing away from the forward side of the vehicle and the vehicle center in the transverse direction of the vehicle.

12. The vehicle according to claim 10, wherein a distance between a region of the guiding surface facing the forward side of the vehicle and the vehicle center in the transverse direction of the vehicle is smaller than a distance between the region of the guiding surface facing away from the forward side of the vehicle and the vehicle center in the transverse direction of the vehicle.

13. The vehicle according to claim 1, wherein the additional air-guiding body increasingly projects beyond the lower side of the vehicle starting from a region of the additional air-guiding body facing the forward side of the vehicle in the direction of the region facing away from the forward side of the vehicle.

14. The vehicle according to claim 13, wherein at least in the region of the additional air-guiding body, at least one air-guiding web is provided, which is arranged between the guiding surface of the air-guiding body and the vehicle center and extends essentially in the longitudinal direction of the vehicle.

15. The vehicle according to claim 1, wherein at least in the region of the additional air-guiding body, at least one air-guiding web is provided, which is arranged between the guiding surface of the air-guiding body and the vehicle center and extends essentially in the longitudinal direction of the vehicle.

16. The vehicle according to claim 14, wherein the air-guiding web has a concave curvature corresponding at least approximately to the guiding surface.

17. The vehicle according to claim 14, wherein a height of the air-guiding web increases at least in sections starting from a region facing the forward side of the vehicle in the longitudinal direction of the vehicle.

18. The vehicle according to claim 16, wherein a height of the air-guiding web increases at least in sections starting from a region facing the forward side of the vehicle in the longitudinal direction of the vehicle.

19. A vehicle, comprising:
an air-guiding device arranged on a lower side of the vehicle in front of a vehicle wheel, which air-guiding device comprises an air-guiding body having a guiding surface essentially extending in a vertical direction of the vehicle and facing a vehicle center, and a bottom region which faces an underlying surface, is connected with the guiding surface and is spaced away from the lower side of the vehicle, wherein
the air-guiding body has an outer region which faces away from the vehicle center, is connected with the bottom region and is constructed with a convex curvature with respect to an outer side of the vehicle such that an air stream in the outer region of the air-guiding body is guidable in the direction of an outer flank of the vehicle wheel, while another air stream is oriented by way of the guiding surface in the longitudinal direction of the vehicle,
the other air stream is oriented by way of the guiding surface additionally in the direction of the vehicle center, and
an edge extending essentially in the longitudinal direction of the vehicle is provided in a joint region between the guiding surface and the bottom region.

20. A vehicle, comprising:
an air-guiding device arranged on a lower side of the vehicle in front of a vehicle wheel, which air-guiding device comprises an air-guiding body having a guiding surface essentially extending in a vertical direction of the vehicle and facing a vehicle center, and a bottom region which faces an underlying surface, is connected with the guiding surface and is spaced away from the lower side of the vehicle, wherein
the air-guiding body has an outer region which faces away from the vehicle center, is connected with the bottom region and is constructed with a convex curvature with respect to an outer side of the vehicle such that an air stream in the outer region of the air-guiding body is guidable in the direction of an outer flank of the vehicle wheel, while another air stream is oriented by way of the guiding surface in the longitudinal direction of the vehicle,
an edge extending essentially in the longitudinal direction of the vehicle is provided in a joint region between the guiding surface and the bottom region, and
the guiding surface and the edge of the joint region are constructed with a concave curvature with respect to the vehicle center.

* * * * *